July 19, 1955 R. L. BROWN 2,713,196
METHOD FOR CLADDING AND PRODUCT RESULTING THEREFROM
Filed Feb. 11, 1955 3 Sheets-Sheet 1
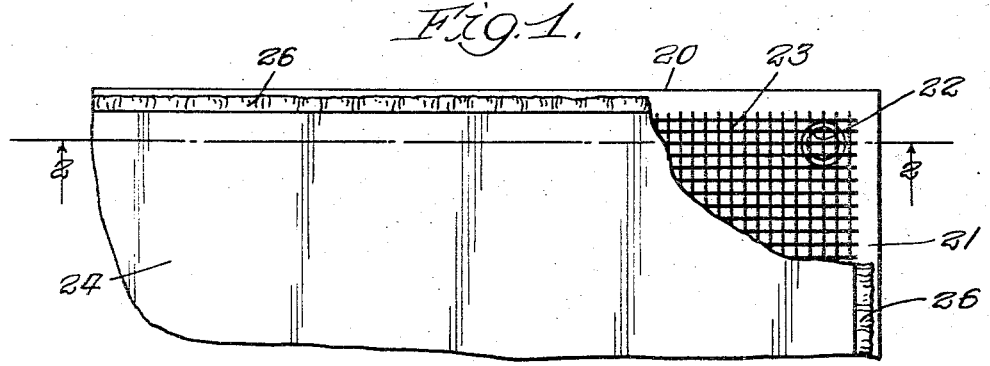
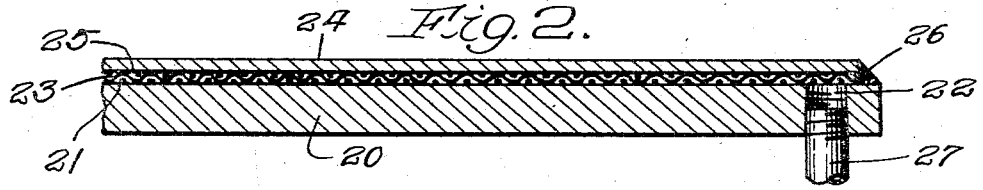
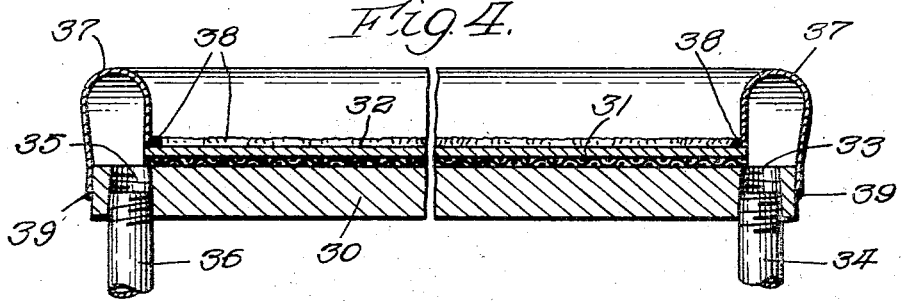
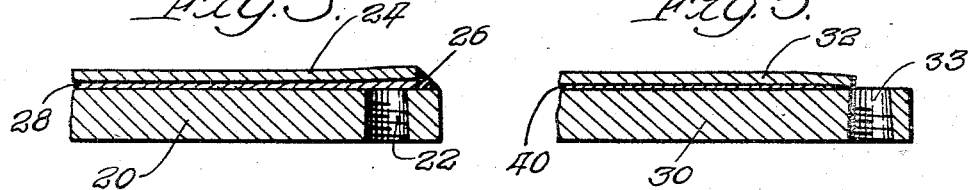
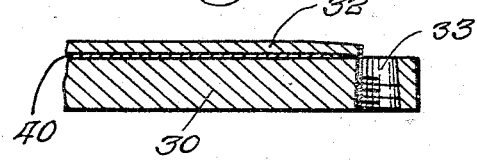
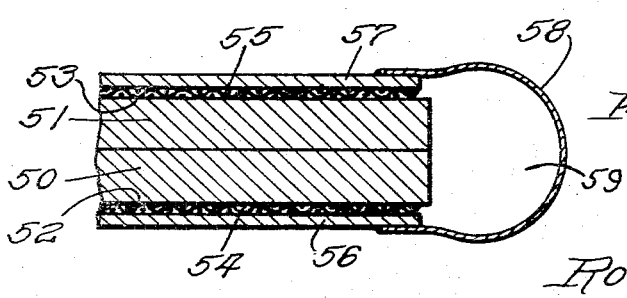
Inventor:
Robert L. Brown,
By Merriam Zorch,
Attys.

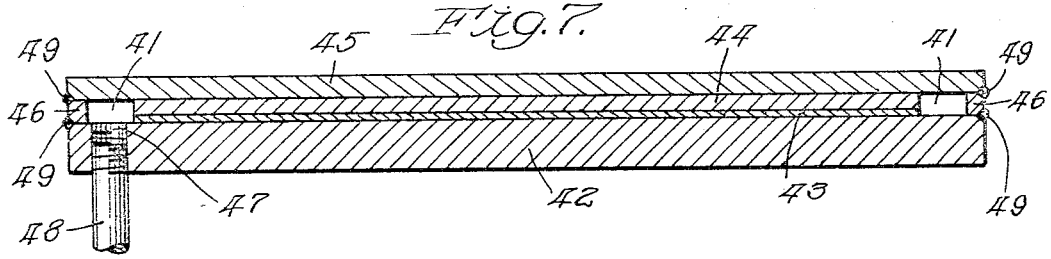
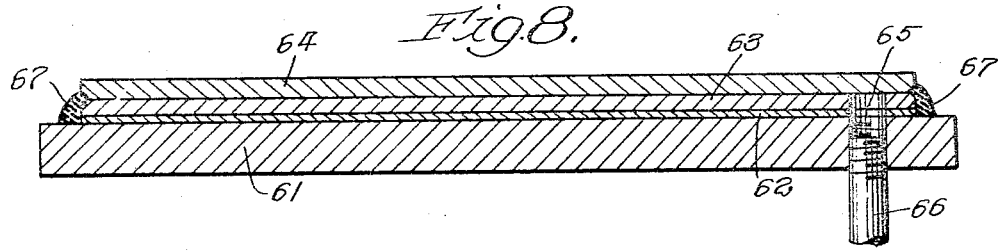
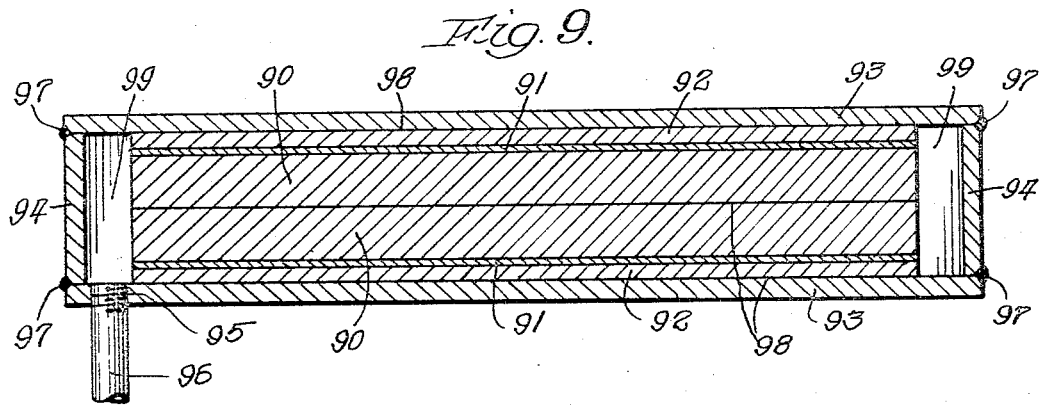
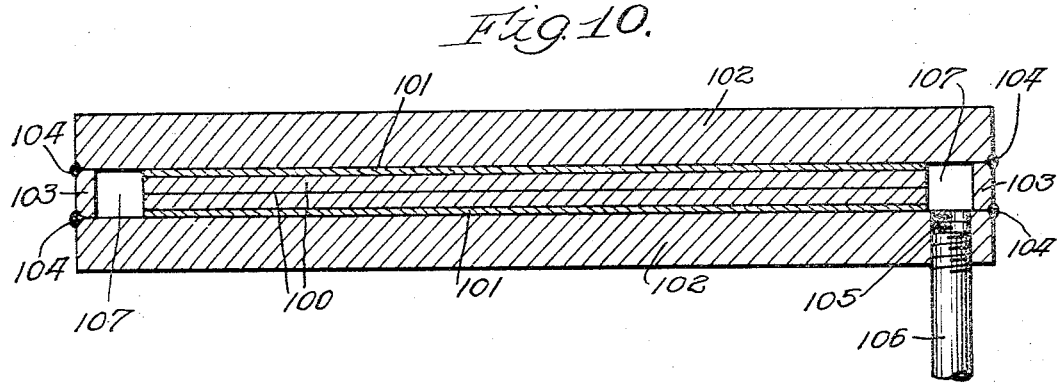

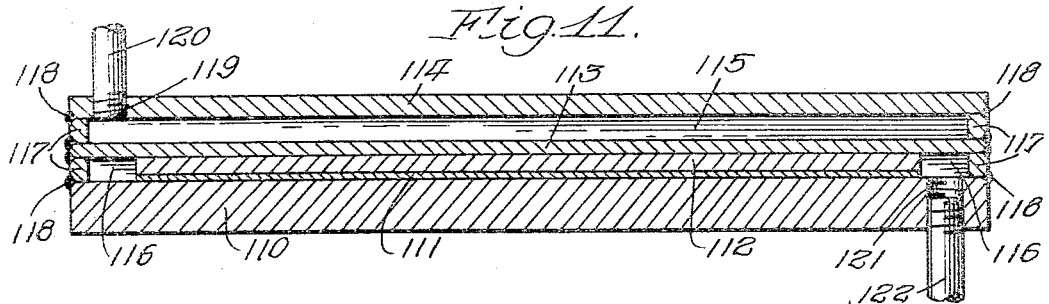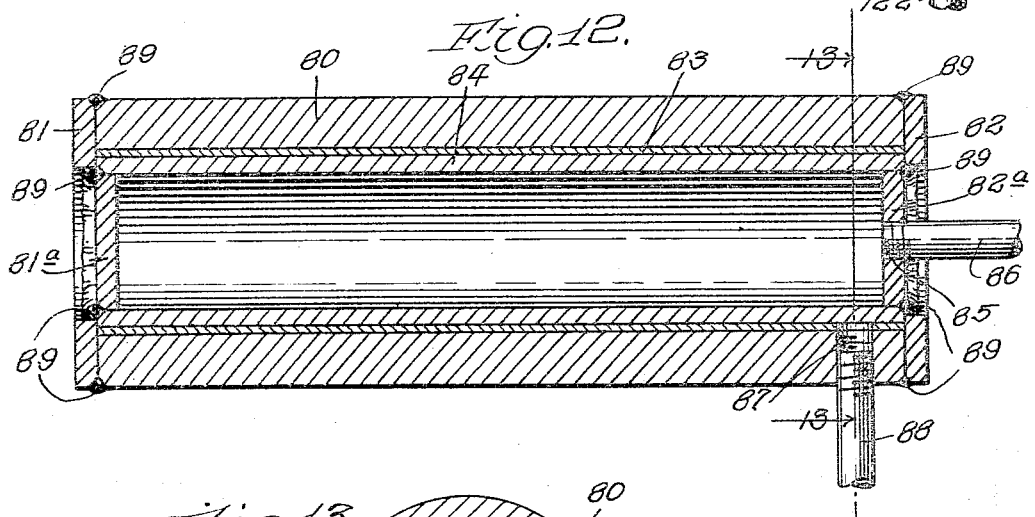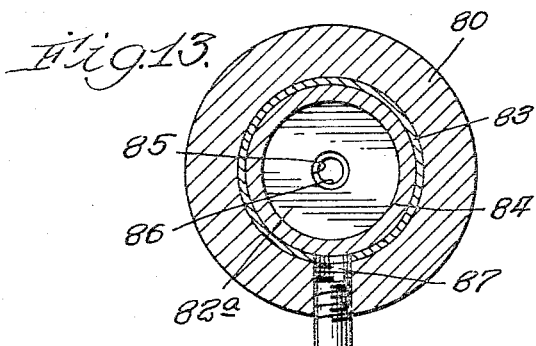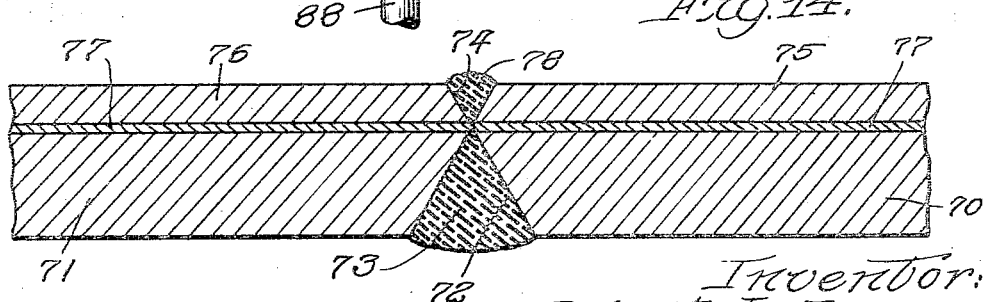

2,713,196

Patented July 19, 1955

United States Patent Office

2,713,196

METHOD FOR CLADDING AND PRODUCT RESULTING THEREFROM

Robert L. Brown, Birmingham, Ala., assignor to Chicago Bridge & Iron Company, a corporation of Illinois Application February 11, 1955, Serial No. 487,676

9 Claims. (Cl. 29—196)

This invention relates to methods for cladding metals and to the products resulting therefrom.

This application is a continuation-in-part of my applications, Serial No. 87,262, filed April 13, 1949, now abandoned, Serial No. 205,528, filed January 11, 1951, now abandoned, and Serial No. 344,391, filed March 24, 1953.

Clad metals, particularly clad ferrous metals such as steels, have been manufactured and used for a considerable period. A clad steel sheet is a composite sheet usually consisting of a commercial grade steel sheet to one or both sides of which there is permanently joined a veneer or cladding of a corrosion resistant or heat resistant metal. The thickness of the cladding metal, as contrasted with plating, constitutes a substantial portion (generally not less than 5%) of the total sheet or plate thickness. There is, of course, no upper limit on the thickness of the cladding metal except economy. Usually the cladding metal will have a thickness of from 20 gauge to 1". Steels have been clad with stainless steel, Monel metal, silver, copper, nickel, etc.

Clad steels are customarily used in the construction of vessels for containing or processing corrosive fluids, particularly at high temperatures, as it would be uneconomical to construct a large vessel capable of withstanding working stresses completely of corrosion or heat resisting metal. Clad steels in which the cladding material furnishes the desired resistant properties and in which the backing plate furnishes the desired strength have provided the most feasible and economical material for such types of construction. Where the bond between the sheets is of sufficient integrity, the total sheet thickness may be used in determining the required thickness for strength.

A number of methods have been employed for effecting the bond between the cladding metal and the metal to be clad, the most common of which being the so-called pressure welding or hot rolling method in which two sheets to be clad are pressed together with two sheets of the cladding material in between to form a sandwich consisting of a layer of common steel, two layers of cladding material topped by another layer of common steel. Flux can be used between the mating surfaces of the cladding metal and the metal to be clad and an infusible substance is placed between the contacting surfaces of the cladding metal to prevent their fusing. The sandwich so made is sealed by welding the edges completely therearound and then is heated to a temperature of 2250 to 2300° F. The heated sandwich is then rolled in a mill under great pressure and this pressure on the white hot sandwich reduces its thickness and plastically bonds the cladding and steel together. After cooling, the edges are cut free and the common steel sheets separated, each of which will then bear a veneer of the cladding metal. This method is not only cumbersome and expensive but also results in a considerable amount of waste as the cladding metals are often damaged by the great pressures required in the rolling operation to reduce the thickness of the sheets, and considerable bi-metallic scrap having little value results (sometimes as much as 30–40%) when a rectangular plate is cut from the irregular as rolled assembly.

Clad sheets have also been made by spot or seam resistance welding the cladding sheet to the base metal, the welding taking place at spots throughout the area of the sheets or throughout more or less of the entire mating surfaces. Clad sheets have been made simply by pouring the metal to be clad in molten form over the cladding metal or, on the other hand, melting the cladding metal on the surface of the metal to be clad.

In some of the prior methods, a very thin layer of a third metal was formed on one of the plates by electroplating or otherwise to be pressure welded to the other plate, but such third metals were infusible, as respects the metals of the sheets.

The clad sheets produced by these prior methods were generally uneven in thickness and did not possess a plane or uniform surface and the bond was not continuous, so that failure at one point permitted corrosion over a large area of the base plate.

According to the process of this invention I am able to produce a superior clad product by a method which is considerably more simple and less expensive than methods of the prior art. In my process I place a sheet or plate of cladding metal and a sheet or plate of metal to be clad in substantially face-to-face arrangement with a thin layer of brazing metal between them. I then apply a vacuum of at least 18 inches of mercury gauge, and preferably a substantially complete vacuum such as above 28–29 inches in the area to be clad, i. e., between the cladding plate and the base plate to be clad. The assembled sandwich is then heated to a brazing temperature sufficient to melt the brazing material and have it wet the mating surfaces. A substantial vacuum of at least 18 inches of mercury gauge is maintained in the area to be clad at least until the brazing material has melted and wet the mating surfaces. In this way a perfect bond is formed between the cladding plate and the base plate. After brazing is effected the sandwich is cooled below the melting range of the brazing material to complete the cladding process.

The use of a vacuum of at least 18 inches of mercury gauge is highly important for producing an integrally and continuously clad product. The vacuum serves two purposes, both of which are significant. First, it removes gases, including gases evolved during heating, that otherwise would prevent successful bonding. Secondly, it causes external pressure to be applied to force or collapse the brazing surfaces together into intimate and uniform contact. This external pressure should at least substantially be that exerted by the atmosphere when the vacuum is 18 inches of mercury gauge. When the vacuum in the area to be clad goes above 18 inches the external pressure, if desired, may be reduced an amount equivalent to the increase in vacuum. Thus, if the vacuum is 28 inches between the plates to be clad, the external pressure may be reduced 10 inches of mercury gauge below atmospheric pressure. The overall external pressure on the brazing area will accordingly only be 18 inches, the minimum pressure suitable for a good bond. Although the external pressure on the sandwich may be so reduced, it is ordinarily more convenient and desirable to have substantially atmospheric pressure forcing the plates into contact for brazing. Super-atmospheric pressures may also be applied against the external surfaces of the sandwich if desired.

By evacuating the space between the plates, I not only create pressure against the brazing material, but quite effectively prevent the formation of gas bubbles which may otherwise form in the brazing material as it melts. For this reason it is advisable to maintain the vacuum during the entire heating process.

The clad product produced according to my invention is integrally and continuously bonded. The cladding plate and base plate in the finished product each have a uniform thickness and are the same thickness as before brazing. Neither the base plate nor the cladding plate is disturbed in the process; distortion of the plates is not necessary to effect the bond. The bond between the cladding plate and base plate is substantially completely free of gases due to the purging action of the vacuum, particularly the higher vacuums.

My process is especially useful for producing large size clad products which were previously unavailable but for which a great need existed. By large size products I mean at least about 2½ feet square. For commercial use, however, much larger clads are produced such as about 8 x 10 feet and larger. Such clad products may be welded together to make still larger units or they may be cut into smaller pieces for specific uses, or they may be formed by hot or cold working into various shapes.

The preferred brazing material is a non-ferrous metal or alloy having a melting point below that of the metals to be joined. The principal requirements of the brazing material, however, are that it have a melting point below that of the metals to be joined, that it be capable, when melted, of wetting the mating surfaces of the metals, and that it have sufficient tensile strength and resistance to shear to produce a union of sufficient soundness, strength and permanence to meet operating or design specifications. The brazing metal may be copper, bronze, or alloys of copper and silicon, copper and phosphorus, silver bearing alloys, or any other suitable metal or alloy. The choice of the brazing material is well within the abilities of those skilled in the art and will depend upon the particular metals being joined. For example, when mild steel, that is low carbon steel having a carbon content in the neighborhood of .25% is being clad with stainless steel, a bronze or copper brazing material may be used. When such steels are being clad with aluminum, a brazing alloy such as an aluminum-silicon alloy may be used. Stainless steel may be clad with copper by my invention, or if desired, metals may be clad with like metals, viz. mild steel on mild steel, it being necessary only to follow the practices as hereinafter set forth and to use the proper brazing material.

While it is clear from this description that my process may be employed for cladding a great variety of base metals with dissimilar metals, it is contemplated that its most common use will be in the field of cladding steels such as structural and boiler or firebox grades of steel, which are usually mild, low carbon steels, for example, those designated by the American Society for Testing Metals as A283 Grade C or D, or A285 Grade C, A 201 and A 212, with heat or corrosion resistant metal such as chromium or chromium-nickel stainless steels, nickel, Monel metal, Hastelloys, Inconel, silver, copper, tantalum, molybdenum, zirconium, titanium, and the like. The thickness of the base or steel sheet will generally be in the order of about 3" or less, although base sheets up to 12" and greater in thickness may also be clad; while the thickness of the cladding metal plate will ordinarily be in the order of 20 gauge to 1". I wish to point out, however, that the invention is not limited to any particular thicknesses of the base metal and the cladding metal. Furthermore, my use of the term "sheet" is to be construed as including a plate and each of these terms is intended to include curved or formed as well at flat sheets or plates.

This invention is also useful for cladding ferrous base plates, including stainless steels, with precious metals such as gold, platinum and silver for use in the jewelry art or for use in industrial chemistry. In addition, it is also useful for cladding non-ferrous base plates such as nickel, chromium and copper with other non-ferrous metals such as silver, gold and the like.

In effecting vacuum brazing according to my invention, the surfaces to be bonded together should be clean. Commercial plates are very often clean enough as received so that no other cleaning is required. However, any and all sheets which are to be used may be cleaned if desired by conventional means, such as pickling, sanding and the like prior to brazing.

According to the principles of this invention I may also produce a clad pipe, that is, a pipe having its interior or exterior consisting of cladding metal. In the past, pipes having clad interiors, commonly known as lined pipes, were produced by telescoping the liner into the pipe or tube and then reducing the pair by swedging or compressing over a mandrel. This process gives a metal to metal contact for the entire length of the pipe but no bond between the pipe and the liner. Piping or tubing so produced cannot be formed or worked because of the danger of separation between the metals. Moreover, a failure at any point in the cladding metal gives rise to corrosion over a large area of the base metal. By using my process, however, I can produce a pipe or tubing clad either exteriorly or interiorly with a cladding metal which is firmly and continuously bonded to the mating surface of the tubing.

The invention will now be described in conjunction with the accompanying drawings in which:

Fig. 1 is a plan view, partially broken away for clarity of illustration, of one method for cladding a plate;

Fig. 2 is a section along line 2—2 of Fig. 1;

Fig. 3 is a view of the completed plate clad by the method of Figs. 1 and 2;

Fig. 4 is a view like Fig. 2 of a modified cladding sandwich;

Fig. 5 is a sectional view of the completed plate clad by the method of Fig. 4;

Fig. 6 is a sectional view of an arrangement for cladding two plates at one time;

Fig. 7 is a sectional view of a cladding sandwich having a cover plate;

Fig. 8 is a sectional view of a cladding sandwich related to Fig. 7;

Fig. 9 is a sectional view of a double cladding sandwich with cover plates, top and bottom;

Fig. 10 is a sectional view of a double cladding sandwich in which the base plates are outside;

Fig. 11 is a cladding sandwich employing a cover plate and an upper chamber for varying the pressure on the cladding sandwich;

Fig. 12 is a longitudinal sectional view showing a method for producing a clad pipe;

Fig. 13 is a sectional view along 10—10 of Fig. 12; and

Fig. 14 is a view showing two clad plates joined together at their extremities.

In carrying out the process according to one embodiment, a plate 20 which is to be clad having a clean upper surface 21 is provided with an opening 22 extending through the plate. Brazing material 23 having the properties hereinbefore discussed is placed upon the surface 21. The brazing material may be in the form of powder, film or foil, in ribbons or rods, or in the form of a foraminous screen as illustrated. Over the screen is placed the cladding metal plate 24 having a clean undersurface 25 which is to be mated with the surface 21. The sandwich so formed is sealed along its edges, such as, for example, by a continuous weld 26. The space or chambered area between the plates and occupied by the brazing material is then evacuated by means of a vacuum pump (not shown) connected to a pipe 27 secured in the opening 22. By producing a substantial vacuum, i. e., not less than about 18" of mercury gauge and preferably in the order of 28-29" of mercury, the plates 20 and 24 are urged together with a pressure equaling in the neighborhood of 2,000 lbs. per sq. ft. Heat is then applied to the plates to raise the temperature of the brazing material 23 to its melting point which, if the brazing metal be bronze, will be in the order of 1700–1900° F., and if copper, then about 1980° F. This is well below the melting point of the metal to be clad, if it be mild steel, and the cladding metal, if the latter be a stainless steel. The vacuum is maintained at least until the brazing material has melted and the mating surfaces wet. At that time it may be released if desired. Preferably, however, the vacuum is maintained until the brazing material has cooled below its melting range. It is most desirable, however, to maintain the vacuum until the sandwich is cooled to an ambient temperature. After cooling, the plate has the characteristics exhibited in Fig. 3 in which the cladding metal 24 is securely bonded to the plate 20 by a fused layer 28 of brazing material therebetween. The weld 26 acts in the nature of a spacer to hold the outer edges of the two plates the same distance apart even after completion of the process. Thus, approximately the outer one or two inches of the plate 24 will appear to be bent upwardly as shown in Fig. 3 relative to the balance of the plate. Under high vacuum the cladding metal is forced inwardly against the brazing material and thus forces the latter into contact with the base plate. When the melting point of the brazing material is reached the plates move together to the extent necessary for the brazing material to fill the entire space then remaining between the plates. This movement, of course, eliminates the void between the plates and, inasmuch as the weld 26 acts as a spacer for the edge portion of the cladding metal, the edges of the cladding plate will not move toward the base metal. Thus, the outer edges of the cladding metal will be spaced a greater distance from the base plate than will the balance of the plate. If desired, these thickened edges may be trimmed off, it being understood that the layer of brazing material is continuous between the plates substantially all the way to the extreme edges thereof. The hole 22 may be plugged by welding metal or by any other suitable manner, or eliminated in the trimming operation. It should be noted that no flux is used between the plates, as by providing a high vacuum therebetween I quite effectively remove oxygen and other evolved gases. Thus, the resulting layer of brazing material or bond is substantially free of slag which would otherwise be present if a flux is used.

Another arrangement for carrying out my process is shown in Fig. 4. As shown in this figure, the plate to be clad 30 has a clean mating surface, prepared such as by pickling or sanding, upon which surface is laid the brazing material 31 in the form of a screen which is then covered by a cladding metal plate 32. A first hole 33 is provided in the plate 30 to which is attached a line 34 connected to a vacuum pump. A second hole 35 is also provided in the plate 30 to which is connected a pipe 36 in turn connected to a source of non-oxidizing gas, such as argon, helium, nitrogen or the like. If a strong reducing agent is desired, hydrogen may be introduced through the pipe 36. The edges of the plates are sealed together by a flexible metal seal 37 welded at 38 and 39 to the cladding metal plate and the base plate respectively. With the edges of the plates so sealed, the vacuum pump is started to evacuate the space between the plates and occupied by the brazing material 31. As the vacuum is being produced, non-oxidizing gas is led into the space through the pipe 36 and opening 35 to wash out any oxygen remaining therein and also to wash out any gases evolving from the metals during the evacuation process and during the subsequent heating step. As heat is applied to the plates to bring the brazing material to its melting point the vacuum pump may continue to operate and the bleeding of gas into the space through the pipe 36 may also continue to flush out any gases evolved from the metals during the heating. The flexible seal 37 permits relative expansion between the plates during the heating cycle and also permits the edge of the cladding plate to move downwardly toward the base plate.

The resulting clad plate is shown in Fig. 5 wherein the cladding plate 32 is firmly bonded to the base plate 30 by a continuous layer 40 of brazing material. It will be noted from an inspection of Fig. 5, however, that the edges of the plates are closer together than the center section of the plate. As a matter of fact, in the area within about one inch of the edge of the plates, there may be metal to metal contact between the cladding metal and the base plate. That is to say, adjoining hills in the surfaces of both plates are in contact, while adjoining valleys are filled with the brazing material.

Again, with the method just described, no flux is necessary and thus the layer of brazing material is free from slag and, except at about the outer one inch of the composite plate, has essentially uniform thickness throughout its entire area.

The method of this invention may also be used for cladding two plates simultaneously, such as by the assembly shown in Fig. 6. As therein illustrated, two plates to be clad 50 and 51 are placed together with clean outer surfaces 52 and 53, which are to be the mating surfaces. Layers of brazing material 54 and 55 are placed upon the mating surfaces upon which are placed the cladding plates 56 and 57. A flexible seal 58 is welded to the cladding plates entirely about their edges to seal the sandwich so formed. A vacuum is then applied to the space 59 around the edges of the plates whereby a vacuum is also achieved in the area to be clad, and the plates are heated to melt the brazing material. The arrangement shown in Fig. 6 is quite useful where the cladding metals and the metals to be clad are so dissimilar as to be non-receptive to the welding of the seal 58 to them. Thus, if the cladding is aluminum, the seal 58 must also be aluminum, and aluminum is difficult to weld to steel. Under such circumstances, the arrangement of Fig. 6 is quite satisfactory, as the seal 58 is welded at both its edges to the cladding metal. Such an aluminum seal could not easily be welded in the manner illustrated in Fig. 4 which requires welding of the seal to the cladding metal along one edge and to the metal to be clad along its other edge.

In Fig. 7 there is shown another arrangement of a sandwich for cladding by my process. To clad with this assembly base plate 42 is covered with brazing material 43 over which is placed cladding plate 44 on top of which is put cover plate 45, preferably of thin steel such as 18 ga. Shims 46 are placed around the sandwich and welded 49 to the cover plate and base plate. Corridor 41 around the cladding plate aids in removal of gases and allows space for differential expansion of the clad layer 44 relative to the base plate 42. If the cladding sheet is thin, shims need not be used for the cover plate may be welded directly to the base plate. Opening 47 is provided in the base plate for drawing a vacuum by line 48 in the area to be clad. Brazing is effected by heating under vacuum as indicated previously.

Fig. 8 shows a cladding sandwich similar to Fig. 7 except that no corridor is provided around the cladding plate and the cover plate is welded directly to the base plate. In Fig. 8 the base plate 61 is placed in face-to-face arrangement with cladding plate 63, between which is placed brazing material 62. Opening 65 is provided through the base plate, brazing material and cladding plate for drawing a vacuum by line 66. Cover plate 64 is placed in face-to-face arrangement with the cladding plate, each of which plates are the same length and width. Cover plate 64 is sealed to the base plate by weld 67. Opening 65 does not extend through the cover plate. Vacuum brazing with this apparatus is effected by the process of my invention hereinabove described.

Fig. 9 shows a double cladding sandwich similar in arrangement to Fig. 6 except that the sandwich has cover plates top and bottom. Such cover plates protect the exterior surfaces of the cladding plates during brazing and also provide a way of sealing the sandwich without fastening the seal to the cladding plate or base plate. When precious metals are involved, such an arrangement is useful to minimize trimming of the finished clad product. In Fig. 9, two base plates 90 are placed face-to-face and against each exterior face there is placed brazing material 91, cladding plate 92 and cover plate 93. Spacers 94 are arranged between the cover plates and at the edges thereof and are welded 97 together. The cover plates are larger than the base and cladding plates, thereby providing corridor 99 around the periphery of said base and cladding plates to aid removal of gases by opening 95 through vacuum line 96. Preferably an inert material 98 such as aluminum oxide is placed between the two base plates 90 and between the cladding plate and cover plate to prevent sticking and aid separation after brazing.

The arrangement of Fig. 10 is a particularly useful one for vacuum cladding according to my process since it protects the cladding plate surfaces, allows ready removal of gases through the corridor 107, and utilizes materials with a minimum of waste. In this arrangement, two cladding plates 100 are placed back to back. Against the outer surfaces of each cladding plate is placed brazing material 101, and in face-to-face arrangement with the brazing material are placed base plates 102 of slightly larger size. Bars 103 are welded 104 to the base plates to seal the sandwich interior from the atmosphere. By means of outlet 105 and vacuum line 106, the sandwich is evacuated and brazed by my process.

The cladding assembly of Fig. 11 illustrates one way in which external pressure on the area being clad may be varied. Base plate 110 is covered with brazing material 111, over which is placed cladding plate 112. A thin flexible cover plate 113 extends over the cladding plate and to the edge of the base plate. Bars 117 are provided between the base and cover plates and the cover plate and lid 114. The assembly is hermetically sealed by welding 118. Outlet 121 is provided in the base plate for producing a vacuum by line 122. Corridor 116 aids removal of gases. The lid has opening 119 for changing the pressure in chamber 115 by line 120. The pressure in chamber 115 may be either increased or decreased as desired. When the pressure in chamber 115 is to be increased considerably, the lid and entire assembly should be reinforced sufficiently to withstand the strain.

My process may be used for cladding tubing or piping; it being necessary only to provide clean mating surfaces with the brazing material therebetween, to force the surfaces into contact with the brazing material and then to apply heat to melt the material and bond the metals together. A simple way of performing the process is illustrated in Figs. 12 and 13, in which I show a pipe or tubing 80 into which has been inserted a liner of cladding metal 84, the exterior surface of which has been covered with a brazing material 83. The brazing material may be applied to the exterior surface of the cladding metal by electroplating, or otherwise, as desired. The ends of the composite tubing are sealed by metal plugs and rings 81, 81a, 82 and 82a. Plug 82a is provided with an opening 85 therein. These plugs and rings are hermetically sealed by welds 89. Atmospheric pressure or increased pressures may be applied to the interior of the composite tubing to aid contact between the tube and liner and such increased pressures may be effected by pipe 86 connected to the opening 85 by use of air or gas or fusible salt or other material which will maintain fluid pressure at the high temperatures involved in the subsequent heating process. Outlet 87 extends through the tube and brazing material, and by means of a line 88 a vacuum is drawn in the area to be clad. The assembly is heated to the fusion temperature of the brazing material to melt the material which will, upon cooling, form an effective bond between the liner of cladding metal and the pipe. Obviously, other methods of forcing the mating surfaces of the pipe and liner into contact with the brazing material may be employed. For example, the pair may be cold reduced, or by choosing a liner having a relatively high co-efficient of expansion, adequate contact may be assured through the expansion of the liner relative to the pipe during the heating process.

Clad plates produced by my process may be welded together as shown in Fig. 14. The backing plates 70 and 71 are placed into final position with their edges adjoining. A groove 72 is formed by chipping, planning, or oxygen cutting in the adjoining edges of the plates. According to well known welding practices, the groove may be U-bottomed, doubled beveled, or may be V-shaped as shown and have proportions depending upon the plate thickness according to accepted practices. This groove preferably extends through the backing plate to just short of brazing material. The groove should then be filled with a weld 73 of the same general composition as the metal in the base plates. After completion of this weld, a V-shaped groove 74 chipped into the adjoining edges of the cladding plates 75 and 76 and extending down through the layer 77 of the brazing material to the base plate is then filled with a weld material 78 using electrodes of the size and type appropriate for the clad side.

Specific examples of my process are as follows:

*Example 1*

A sandwich was assembled as illustrated in Figs. 1 and 2. It comprised an A–285 C steel base plate (7/16" thick) and a Type 405 Stainless steel plate (5/64" thick) with a brazing material between the two plates of common bronze window screen. The mating surfaces of the plates were cleaned by sandblasting and the surfaces of the bronze screen washed with a 15% hydrochloric acid solution and air-dried prior to assembling the sandwich. The screen wire consisted substantially of 87.6% copper, 9.3% zinc, .1% tin, and 3% iron and aluminum, with traces of sulfur and phosphorous. The screen was woven of .011" diameter wire. After sealing the sandwich along its edges, it was heated to a temperature of 1800–1900° F. in a furnace while maintaining a vacuum of 29" of mercury in the space between the plates. This temperature was held for 15 minutes and then the plates were furnace-cooled. No flux was used. Examination and tests of the resulting composite plates showed a continuous layer of brazing material between the plates which was completely free of slag. The bond was excellent.

*Example 2*

A sandwich, such as shown in Figs. 1 and 2 was made up consisting substantially of an A–285 C steel base plate (5/8" thick), and a Type 430 Stainless steel plate (1/8" thick), with a bronze window screen as a brazing material between the two plates. The assembly, after being sealed about its edges, was subjected to a vacuum of about 29" of mercury and then heated to 2000° F. in the furnace. The temperature was held for 15 minutes, after which is was lowered to 1600° F. for one hour. The vacuum was released and the plates cooled at 50° F. per hour down to 1100° F. The composite plate was then removed from the furnace and air-cooled. The resulting composite plate was so perfectly annealed as to permit strips cut from the plate to be bent 180° flat upon themselves with the cladding both on the inside and the outside of the bend without failure of the bond between the plates and without cracking of the cladding metal.

*Example 3*

A sandwich was assembled consisting essentially of an A–285 C steel base plate (5/8" thick) and a Type 405 Stainless steel cladding plate (5/64" thick) with a bronze wire screen between the plates. The mating surfaces of the plates were sandblasted and then washed with a 15% solution of hydrochloric acid. The screen was similarly washed. The plates were air-dried and assembled in the manner illustrated in Fig. 4. The edges of the package were sealed and the package was placed in a furnace. A 29" vacuum was pulled on the space between the plates, and then argon was bled into the space to release the vacuum. The flow of argon was then cut off and the vacuum pump again started to reestablish a 29" vacuum in the space between the plates. The assembly was heated to 1800–1900° F., held at this temperature for 15 minutes, after which the gas burners were cut off, the furnace door opened and the assembly cooled to 1100° F. The vacuum pump was then stopped and the assembly removed from the furnace and air-cooled. No flux was used in the operation and examination of the plate revealed a perfectly continuous layer of brazing material between the plates

Example 4

A sandwich was assembled, as shown in Figs. 1 and 2, consisting essentially of an A–285 C steel base plate (7/16" thick) and a Type 405 Stainless steel plate (1/64" thick) with a .0025" thick copper foil between the plates. The mating surfaces of the plates were cleaned by grinding and the copper foil was cleaned to remove all traces of dirt and grease prior to assembling the plates. The sandwich was sealed along its edges and then heated in a furnace to 2050° F., held at this temperature for about 40 minutes while maintaining a vacuum between the plates of the order of 28–29" of mercury, and then slowly furnace-cooled to about 300° F.; whereupon it was heated to about 1620° F., held at this temperature for approximately 40 minutes, air-cooled, then heated to about 1250° F., held at this temperature for about 45 minutes, and then air-cooled to room temperature. No flux or reducing gas was used. Examination of the resulting composite plate showed a continuous, excellent bond. Specimens were tested for shear strength, tensile strength, and degree of free bend. All of these tests gave results which were above the ASTM requirements.

Example 5

A sandwich was assembled as shown in Figs. 1 and 2, consisting essentially of an A–285 C steel base plate (17" x 3/8 x 23") and a Type 410 Stainless steel plate (12½" x 14 gauge x 18½") with a copper foil (.0025" thick) between the two plates. The mating surfaces of the plates were cleaned by grinding and the copper was cleaned to remove all traces of dirt and grease prior to assembling the sandwich. The sandwich was sealed along its edges and then heated in a furnace to 2050° F., held at this temperature for about 40 minutes, slowly furnace-cooled to 500° F. and then air-cooled to room temperature. A vacuum of the order of 28½" of mercury was maintained in the space between the plates during heating and until the sandwich was cooled to below 500° F. No flux or reducing gas was used. Examination of the resulting composite plates showed a continuous, excellent bond. Specimens were tested for shear strength, tensile strength, and degree of free bend. All of these tests gave results which were above ASTM requirements.

Example 6

A sandwich was assembled substantially as shown in Figs. 1 and 2, consisting of an A–285 C steel base plate (5'5" x 3/8" x 12'5") and a Type 316 ELC steel plate (of substantially the same linear dimensions as the base plate, but having a thickness of 12 gauge) with a .0025" thick copper foil between the plates. The mating surfaces of the plates and the copper were cleaned prior to assembly. The sandwich was sealed along its edges and then heated in a furnace to 2050° F., held at this temperature for about 30 minutes, slowly furnace-cooled to below 900° F., then heated to 1620° F. over a period of 1½ hours, held at this temperature for about 45 minutes, following which it was air-cooled to room temperature. During this heat treatment, a vacuum of the order of 28.9" was maintained in the space between the plates. No flux or reducing gas was used. Examination of the resulting composite plate showed a continuous, excellent bond. Specimens were tested for shear strength, tensile strength and elongation. All of the tests gave results which were above the ASTM requirements.

Example 7

A sandwich was assembled substantially as shown in Figs. 1 and 2, consisting essentially of an A–285 C steel base plate (17" x 3/8" x 23") and a Monel plate (12" x 12 gauge x 18") with a .01" thick copper foil between the plates. The mating surfaces of the plates and of the copper were cleaned prior to assembly in order to remove any grease and dirt. The sandwich was sealed along its edges and then heated in a furnace to 2100° F., held at this temperature for about 40 minutes and then slowly furnace-cooled to below 500° F. The sandwich assembly was then heated to 1620° F., held at this temperature for about 45 minutes, following which it was air-cooled to room temperature. A vacuum of about 28.7" of mercury was maintained in the space between the plates during all of the heating and cooling cycles. No flux or reducing gas was used. Examination of the resulting composite plate showed a continuous, excellent bond. Specimens were tested for shear strength, tensile strength, and elongation. All of these tests gave results which were above the ASTM requirements.

Example 8

A sandwich was assembled substantially as shown in Figs. 1 and 2, consisting essentially of an A–285 C steel base plate (17" x 3/8" x 23") and a nickel plate (12¼" x 12 gauge x 18¼") with a .01" thick copper foil as the brazing material between the plates. The mating surfaces of the plates and of the copper were cleaned to remove dirt and grease prior to assembling the plates. The sandwich assembly was sealed along its edges and then heated in a furnace to 2100° F., held at this temperature for 20 minutes, slowly cooled to below 500° F., heated to 1620° F., held at this temperature for about 45 minutes, and then air-cooled to room temperature. A vacuum of 28.7" of mercury was maintained in the spaces between the plates during the heating and cooling cycles. No flux or reducing gas was used. Examination of the resulting composite plates showed a continuous, excellent bond. Specimens were tested for shear strength, tensile strength, and elongation. All of these tests gave results which were above the ASTM requirements.

Example 9

A sandwich was assembled substantially as shown in Figs. 1 and 2, consisting essentially of an A–283 mild steel base plate (17" x 3/8" x 23") and a Monel plate (12" x 12 gauge x 18") with a .003" thick silver alloy foil (consists of 50% silver, 15½% copper, 15½% zinc, 16% cadmium, and 3% nickel) between the plates. The mating surfaces of the plates and the silver alloy foil were cleaned to remove grease and dirt prior to assembling the sandwich. The sandwich assembly was sealed along its edges and then heated in a furnace to 2050° F., held at this temperature for 1½ hours and then slowly furnace-cooled to below 500° F. A vacuum of 29.6" of mercury was maintained in the space between the plates during the heat treatment and until the sandwich was cooled below 500° F. No flux or reducing gas was used. Examination of the resulting composite plate showed a continuous, excellent bond. Specimens were tested for shear strength and elongation. All of these tests gave results which were above the ASTM requirements.

Example 10

A sandwich was assembled substantially as shown in Figs. 1 and 2, consisting essentially of an A–285 C steel base plate (21" x 1" x 25") and an Inconel plate (16" x 12 gauge x 20") with a .0025" thick copper foil between the plates. The mating surfaces of the plates and the copper were cleaned to remove any dirt and grease prior to assembling the sandwich. The sandwich assembly was sealed along its edges and then heated to 2230° F., held at this temperature for about 1 hour and then slowly furnace cooled. A vacuum of 29.6" was maintained in the space between the plates throughout the entire heating and cooling cycle. No flux or reducing gas was used. Specimens were tested for shear strength, tensile strength, and elongation. All of these tests gave results which were above the ASTM requirements.

Example 11

A sandwich was assembled substantially as shown in Figs. 1 and 2, consisting essentially of an A–285 C steel base plate (17" x ⅜" x 23") and a Hastelloy "C"[1] plate (13½" x .150" x 19.5") with a .0025" thick copper foil between the plates. The mating surfaces of the plates and of copper were cleaned to remove any dirt and grease prior to assembling the sandwich. The sandwich was sealed along its edges and then heated in a furnace to 2100° F., held at this temperature for about 30 minutes and then rapidly air-cooled while maintaining a vacuum of about 28.5" of mercury during the heating cycle. No flux or reducing gas was used. Examination of the resulting composite plates showed a continuous, excellent bond. Specimens were tested for shear strength, tensile strength, and elongation. These tests gave results which were all above the ASTM requirements.

Example 12

A sandwich was assembled substantially as shown in Figs. 1 and 2, consisting essentially of an A–285 C steel base plate (⅜" thick) and Hastelloy "B"[2] plate (.150" thick) with a .01" thick copper foil between the plates. The mating surfaces of the plates and the copper were cleaned to remove the dirt and grease prior to assembling the sandwich. The sandwich was then sealed along its edges, following which it was heated to 2050° F., held at this temperature for 20 minutes while maintaining a vacuum of about 28½" of mercury in the space between the plates and then water-quenched in 56° F. circulating water to room temperature. No flux or reducing gas was used. Examination of the resulting composite plates showed a continuous, excellent bond. Speciments were tested for shear strength, tensile strength, and elongation. All of these tests gave results which were above the ASTM requirements.

Example 13

A sandwich was assembled substantially as shown in Figs. 1 and 2, consisting essentially of a 316 Stainless steel base plate (6½" x ½" x 6½") and a fine silver plate (5" x 1/16" x 5") with a .003" thick foil of "Easy-Flow No. 3" silver brazing alloy between the plates. Easy-Flow No. 3 consists of 50% silver, 15½% copper, 15½% zinc, 16% cadmium, and 3% nickel. The mating surfaces of the plates and the silver alloy foil were cleaned prior to assembling the plates. The sandwich was sealed along its edges and then heated in a furnace to 1600° F., held at this temperature for about 30 minutes, and then air-cooled while maintaining a vacuum of about 28½" of mercury in the space between the plates. No flux or reducing gas was used. Examination of the resulting composite plates showed a continuous, excellent bond. Physical tests were made on test specimens. Shearing tests showed that the bond area was higher in shear strength than the silver itself by shearing above the bond in the silver.

Example 14

A sandwich was assembled substantially as shown in Figs. 1 and 2, consisting essentially of a 316 Stainless steel plate (6½" x ½" x 6½") and a plate of fine silver (5" x 1/16" x 5") with a .005" thick BT silver brazing alloy between the plates. The BT silver brazing alloy consists of 72% silver and 28% copper. The mating surfaces of the plates and of the silver alloy were cleaned to remove any dirt and grease from the surface prior to assembling the sandwich. The edges of the sandwich were then sealed. The sandwich was then heated to 1600° F., held at this temperature for 30 minutes and then air-cooled. A vacuum of the order of 28½" of mercury was maintained during the heating and cooling cycle. No flux or reducing gas was used. Examination of the resulting composite plates gave a continuous, excellent bond.

Example 15

A sandwich was assembled substantially as shown in Figs. 1 and 2, consisting essentially of a 316 Stainless steel plate (13" x 1" x 13") and a plate of copper (12" x ¼" x 12") with a .003" thick Easy-Flow No. 3 silver brazing alloy between the plates. This silver alloy consists of 50% silver, 15½% copper, 15½% zinc, 16% cadmium, and 3% nickel. The mating surfaces of the plates and of the silver alloy were cleaned to remove any dirt and grease from the surface prior to assembling the sandwich. The edges of the sandwich were then sealed. The sandwich was then heated to 1600° F., held at this temperature for approximately 30 minutes and then air-cooled. A vacuum of the order of 28½" of mercury was maintained during the heating and cooling cycle. No flux or reducing gas was used. Examination of the resulting composite plate showed a continuous, excellent bond. Physical tests were made on test specimens. Shearing tests showed that the bond area was higher in shear strength than the copper itself by shearing above the bond in the copper.

Example 16

A double cladding sandwich was prepared as in Fig. 10, consisting of two sheets of titanium 5⅛" x 12 gauge x 12" one 17½" by 5/16" x 12⅛" carbon steel plate, one 16½" x 5/16" x 11⅛" carbon steel plate, and about 125 sq. in. of 0.003" thick silver brazing alloy. The titanium inner sandwich was separated with a fine coating of aluminum oxide. The sandwich was evacuated to above 29 inches of mercury and charged into a furnace pre-heated to 2100° F. The furnace reached the bonding temperature of 1900° F. in 15 minutes. The sandwich was held at this temperature for 10 minutes then the furnace was cooled to 1775° F. with the furnace door open. The sandwich was then slowly cooled in the furnace with the door closed to room temperature. The sandwich was cut open and the titanium was found to be soundly bonded to the steel plates.

Example 17

A single sandwich was prepared as in Fig. 7 of a 5½" x ½" x 5½" Stainless steel base plate, one gold sheet 3" x 16 gauge x 3", sufficient .0025" BT silver foil brazing alloy, a cover plate 5" x 20 gauge x 5" and enough ¾" x 20 gauge Stainless steel shims to go around the edge. The sandwich was evacuated to a vacuum of 18 microns of mercury and placed into a furnace preheated to 1700° F. The sandwich was heated for 24 minutes, during which the furnace temperature reached a maximum of 1770° F., the sandwich a maximum temperature of 1700° F., and the vacuum no lower than 31 microns. After cooling, the sandwich was opened and the bond found to be secure and strong.

---

[1] Hastelloy "C" is a high nickel-chromium-molybdenum-iron alloy consisting of 13–16% chromium, 15–19% molybdenum, 3.5–5.5% tungsten, 4–7% iron, 52–64% nickel, and .15% max. carbon.

[2] Hastelloy "B" consists of 26–30% molybdenum, 4–7% iron, .12% max. of carbon, and the balance nickel.

While I have shown and described certain embodiments of my invention, it is to be understood that is is capable of many modifications. Changes, therefore, in the construction and arrangement may be made without departing from the spirit and scope of the invention as disclosed in the appended claims.

What is claimed is:

1. A method of brazing a metal plate to another metal plate, comprising: placing the plates in substantially continuous face-to-face arrangement with a thin layer of brazing material between them, the metal plate surfaces to be brazed being clean; hermetically sealing the edges of the plates to produce a chambered area therebetween but providing an opening to the chambered area for applying a vacuum condition therein; applying a vacuum of not less than about 18 inches of mercury gauge in the chambered area; heating the assembled plates to a brazing temperature sufficient to melt the brazing material while maintaining said vacuum, said metal plates being of such size and thickness that a major proportion of their contiguous surfaces move together at said brazing temperature and under said vacuum condition in the chambered area; and cooling the assembled plates to below the melting range of the brazing material while maintaining said vacuum in the chambered area.

2. In the cladding of a clean ferrous metal base plate with a relatively clean metal cladding plate selected from the group consisting of chromium steel, chromium-nickel steel, nickel, Monel, Inconel, Hastelloy, copper, gold, platinum and silver, the steps of covering one of the surfaces of said plates with a clean brazing material; placing the other plate on the brazing material to form a sandwich assembly; hermetically sealing the edges of the sandwich, except for at least one connection to a vacuum pump, to form a chambered area between the plates; producing a vacuum of not less than 18" of mercury in the chambered area within the sandwich; heating the sandwich in a furnace to a brazing temperature sufficient to melt the brazing material, whereby gases are evolved within the sandwich; continuing evacuation of the chambered area during the heating to remove such gases as form and substantially completely to remove oxides from the area to be brazed, said plates being of such size and thickness that a major proportion of their contiguous surfaces move together at said brazing temperature and under said vacuum condition in the chambered area; and then cooling the sandwich below the melting range of the brazing material.

3. A method of cladding a cladding plate to a base plate which comprises placing such plates in substantially continuous face-to-face arrangement with a supply of brazing material between said plates in the area to be clad, placing a cover plate over the cladding plate in face-to-face arrangement therewith, hermetically sealing the cover plate to the base plate about the edges of the sandwich so formed, providing at least one outlet leading from the inside of the sandwich to a vacuum pump, producing a vacuum of at least 18 inches of mercury gauge in the area to be clad while maintaining substantially atmospheric pressure on the external surfaces of the plates, heating the sandwich of plates to melt the brazing material while maintaining the vacuum at least until the brazing material is melted and wets the area to be clad and cooling the sandwich to below the melting range of the brazing material.

4. A method of simultaneously cladding a plurality of base plates with cladding plate comprising: placing a base plate and cladding plate in substantially continuous face-to-face arrangement with a thin layer of brazing material between them to produce a single cladding sandwich, arranging at least two such single sandwiches of substantially the same shape and surface area in substantially continuous face-to-face arrangement to produce a multiple sandwich, placing cover plates in face-to-face arrangement with the top and bottom plates of the multiple sandwich, hermetically sealing the top cover plate to the bottom cover plate about the edges of said cover plates, providing at least one outlet leading from the inside of the multiple sandwich to a vacuum pump, producing a vacuum of at least 18 inches of mercury gauge in the area between the outer plates while maintaining substantially atmospheric pressure on the external surfaces of the plates being brazed, heating the assembled plates to a brazing temperature sufficient to melt the brazing material and have it wet the mating surfaces of the plates being clad while maintaining said vacuum, said plates being of such size and thickness that a major proportion of their contiguous surfaces move together at said brazing temperature and under said vacuum, and cooling the assembled plates to below the melting range of the brazing material.

5. A method of simultaneously cladding a plurality of base plates with cladding plate comprising: placing a base plate and cladding plate in substantially continuous face-to-face arrangement with a thin layer of brazing material between them to produce a single cladding sandwich, arranging at least two such single sandwiches of substantially the same shape and surface area in substantially continuous face-to-face arrangement to produce a multiple sandwich, hermetically sealing the outermost top plate to the outermost bottom plate of the assembly, said sealing being about the edges of the outermost plates, providing at least one outlet leading from the inside of the multiple sandwich to a vacuum pump, producing a vacuum of at least 18 inches of mercury gauge in the area between the outer plates while maintaining substantially atmospheric pressure on the external surfaces of the plates being brazed, heating the assembled plates to a brazing temperature sufficient to melt the brazing material and have it wet the mating surfaces of the plates being clad while maintaining said vacuum, said plates being of such size and thickness that a major proportion of their contiguous surfaces move together at said brazing temperature and under said vacuum, and cooling the assembled plates to below the melting range of the brazing material.

6. A method of forming clad plates comprising forming a sandwich including a base plate and a cladding plate with a thin layer of brazing material between them, the metal plate surfaces to be brazed being clean, hermetically sealing the edges of said sandwich to produce a chambered area between the plates but providing an opening to the chambered area for applying a vacuum condition therein; applying a vacuum of not less than about 18 inches of mercury gauge in the chambered area; heating the assembled plates to a brazing temperature sufficient to melt the brazing material while maintaining said vacuum, said metal plates being of such size and thickness that a major proportion of their contiguous surfaces move together at said brazing temperature and under said vacuum condition in the chambered area; and cooling the assembled plates to below the melting range of the brazing material while maintaining said vacuum in the chambered area.

7. The method of claim 6 in which said vacuum is at least 28 inches of mercury gauge.

8. A composite clad product produced by the method of claim 6 comprising a base plate and a cladding plate integrally and continuously bonded together in face-to-face arrangement by a brazing material between said plates, said bond being flux-free and vacuum purged substantially free of all gases, including adsorbed and occluded gases released during brazing, said plates being of uniform thickness throughout the clad product and having the same thickness and shape as when the plates were placed in face-to-face arrangement for vacuum brazing.

9. A composite clad product produced by the method of claim 6 having a linear dimension of not less than 2½ feet and comprising a base plate and a cladding plate integrally and continuously bonded together in face-to-face arrangement by a brazing material between said plates, said bond being flux-free and vacuum purged substantially free of all gases, including adsorbed and occluded gases released during brazing, said plates being of uniform thickness throughout the clad product and having the same thickness and shape as when the plates were placed in face-to-face arrangement for vacuum brazing.

References Cited in the file of this patent

UNITED STATES PATENTS

| | | |
|---|---|---|
| 1,152,610 | DeBats | Sept. 7, 1915 |
| 1,956,818 | Acre | May 1, 1934 |
| 2,093,814 | Mann | Sept. 21, 1937 |
| 2,147,407 | Huston et al. | Feb. 14, 1939 |
| 2,160,558 | Orr | May 30, 1939 |
| 2,227,295 | Cope | Dec. 31, 1940 |
| 2,269,523 | Deutsch | Jan. 13, 1942 |
| 2,284,504 | Wrighton et al. | May 26, 1942 |
| 2,416,400 | Mehl | Feb. 25, 1947 |
| 2,473,712 | Kinney | June 21, 1949 |
| 2,685,124 | Toulmin | Aug. 3, 1954 |